June 1, 1926.
S. H. SHEPHERD
1,586,761
PRODUCTION OF HIGH PRESSURE STEAM FOR MOTIVE PURPOSES
Filed Oct. 13, 1925
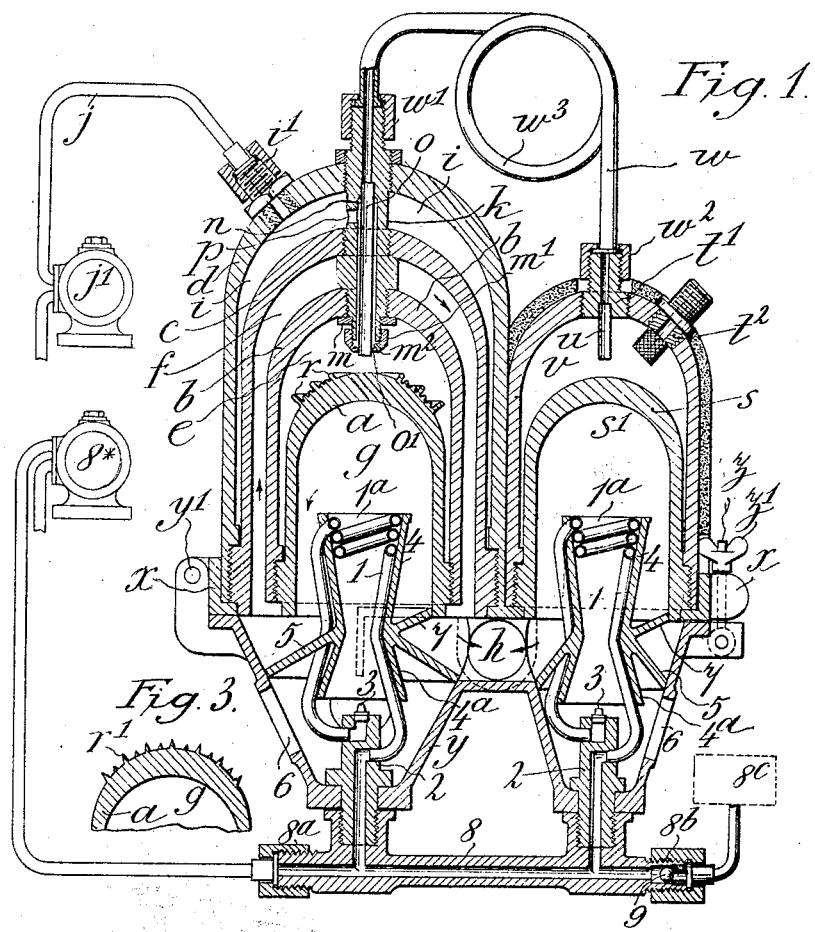
Fig. 1.
Fig. 3.
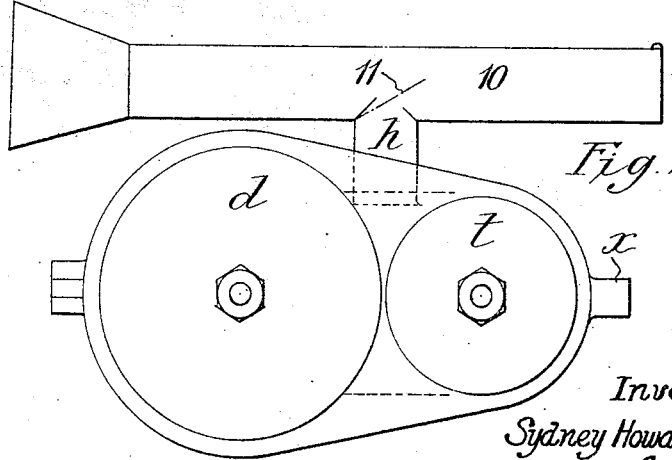
Fig. 2.
Inventor
Sydney Howard Shepherd
By Dowell & Dowell
his Attorneys Patented June 1, 1926.

1,586,761

UNITED STATES PATENT OFFICE.

SYDNEY HOWARD SHEPHERD, OF CRICKLEWOOD, LONDON, ENGLAND.

PRODUCTION OF HIGH-PRESSURE STEAM FOR MOTIVE PURPOSES.

Application filed October 13, 1925, Serial No. 62,303, and in Great Britain May 23, 1924.

This invention has reference to improvements in the method of and apparatus for producing, at a high temperature and pressure, steam suitable for use in an engine, and it has for its object to enable such steam to be produced in a more economical and advantageous manner than heretofore usual.

For this purpose, water is forced under pressure through a conduit or conduits in which it is gradually or successively raised to a temperature corresponding, or approximately so, to that corresponding to the pressure of the steam to be produced, the water thus heated being projected into the upper part of a steam generating chamber and brought into contact therein with a highly heated body or surface so that it will immediately be converted into steam, the steam so produced being then led from the upper part of the steam generating chamber through another conduit and projected through the upper part of a separately heated steam superheating chamber and into contact with another highly heated body or surface in such chamber wherein it is allowed to expand and which has an outlet at its upper part, any water present with the steam in the steam generating chamber, or in the superheating chamber, being allowed to separate from the steam and fall into a lower heated portion of the chamber in which it can gradually be evaporated, so that high pressure superheated steam can be led off from the upper part of the superheating chamber in a dry state through another conduit to an engine or other device in which it is to be utilized.

The heating of the said bodies may advantageously be effected by the combustion of liquid fuel, preferably a heavy hydrocarbon oil, such for example as Mexican fuel oil, which has a high specific gravity, say for example, .905, and is capable of evolving, when burnt, a very high temperature. In this case, the highly heated products of combustion escaping from the combustion chamber used for heating the body against which the highly heated water, preferably in the form of spray, is first projected, may be utilized, to a large extent in heating the water on its way to the steam generating chamber. The heated body for the steam generating chamber and for the steam superheating chamber may advantageously be constituted by the wall of the corresponding combustion chamber.

Steam generating and superheating devices adapted to work in the manner set forth can be variously constructed.

Conveniently, each of these devices may be constituted by two cylindrical metal tubes having dome shaped upper ends arranged concentrically one within the other, at a suitable distance apart, and connected together at their lower ends in a fluid tight manner, as for example by screwing, so as to form an upper hollow part-spherical chamber having a lower narrow annular shaped extension, the two chambers of the two devices being in communication at their upper ends with one another, and the steam generating chamber having an upper inlet for water and the steam superheating chamber having an upper outlet for highly superheated steam. The heating of the inner or lower wall of each chamber, which also forms the wall of the corresponding combustion chamber, may advantageously be effected by the combustion within the latter chamber of a jet of liquid fuel issuing from a burner nozzzle to which it is supplied, under pressure, through a coiled pipe arranged within the combustion chamber, so that the fuel will become highly heated on its way to the nozzle. The steam generating device has associated therewith a water supply chamber having an inlet for connection to a feed water supply pump and an outlet connected to a nozzle device whereby water can be injected into the upper end of the steam generating chamber. Also, associated with the steam generating chamber and water supply chamber are means whereby water will become heated to a high temperature during its passage from the latter chamber to the steam generating chamber by heat derived from the hot exhaust products of combustion flowing from the combustion chamber associated with the steam generating chamber. The steam superheating device may be lagged or otherwise protected against loss of heat therefrom by radiation.

In the accompanying illustrative drawings Fig. 1 shows in vertical section and Fig. 2 in plan, one construction of combined steam generating and superheating apparatus according to the invention. Fig. 3 is a sectional detail view.

In the example shown, the steam generator comprises two concentrically arranged cylindrical tubes $a$ and $b$ having dome shaped upper ends surrounded by two similarly shaped and concentrically arranged tubes $c$ and $d$ also having dome shaped upper ends, the two outer tubes being secured together at the lower ends in a fluid tight manner, as by screwing as shown, like the two inner tubes constituting between them the steam generating chamber $e$. The inner of the two outer tubes, namely $c$, is spaced at a short distance from the outer tube of wall $b$ of the steam generator, so as to form therewith an annular flue $f$ that is in communication at one side with the lower end of the corresponding combustion chamber $g$ formed by the inner tube or wall $a$ of the steam generator and at the opposite side with an exhaust outlet $h$. The inner tube $c$ of the two outer tubes is also spaced at a distance from the outermost tube $d$ so as to form therewith a water supply chamber $i$ which is provided with a tubular screw threaded nipple $i^1$ for connection with a feed water supply pipe $j$ and pump $j^1$. Extending axially through and screwed to the dome shaped upper ends of the two outer tubes $c$ and $d$ and the upper end of the outer tube or wall $b$ of the steam generator, so as to form a fluid tight joint with each of them, is an axially arranged tube $k$ that is provided at its lower end, within the steam generating chamber $e$, with nuts $m$, $m^1$, the lower of which namely $m^1$, is adapted, as by means of perforations $m^2$ therein to be in communication with the interior of the said tube $k$ to form a water spraying nozzle adapted to project water on to the top of the wall $a$ of the steam generator. Fixed centrally within the axially arranged tube $k$ and so as to form therewith a longitudinal annular water inlet passage $n$, is a pipe $o$ the lower end $o^1$ of which fits within the spraying nozzle $m^1$ and is open to the steam generating chamber $e$ and the upper end of which communicates with the upper end portion of the central passage through the tube $k$. The annular passage $n$ is in communication through one or more lateral holes $p$ in the tube $k$ with the water supply chamber $i$. The arrangement is such that water (which may be supplied from a feed water heater) delivered under pressure into the chamber $i$ will pass through the lateral holes $p$ in the tube $k$, into the annular water inlet passage $n$ and thence through the spraying nozzle $m^1$ on to the top of the tube $a$ forming the roof of the combustion chamber $g$ the water during its passage through the chamber $i$ and tube $k$ being heated to a high temperature by the highly heated products of combustion flowing from the combustion chamber $g$ through the flue $f$, as and for the purpose hereinbefore mentioned.

With a view to preventing any water that may assume the spheroidal condition upon contact with the heated roof of the combustion chamber $g$, from rolling down to the bottom of the steam generating chamber $e$, the said roof may, as shown, be provided with a series of concentrically arranged upwardly and outwardly extending annular flanges $r$. Also, with a view to prevent water assuming the spheroidal form, or for breaking up any water globules so formed, the said roof may be provided with a number of upwardly extending pointed projections $r^1$ as shown in Fig. 3. Any water that may fall to the annular bottom of the steam generating chamber $e$ will readily be evaporated by the heated wall $a$ of the combustion chamber with which it will be in contact.

The steam superheater comprises two coaxially arranged tubes $s$ and $t$ having dome shaped upper ends spaced apart like those $a$ and $b$, comprising the steam generator. The upper end of the outer tube $t$ is provided with a central screw threaded tubular nipple $t^1$ carrying a tube $u$ extending into the superheating chamber $v$ formed between the two tubes $s$ and $t$. $s^1$ is the corresponding combustion chamber formed by the tube $s$.

The top of the tube $k$ of the steam generator chamber $e$ is connected to the nipple $t^1$ of the steam superheating chamber $v$ by a pipe $w$ and suitable screw coupling devices $w^1$ and $w^2$. The pipe may, as shown, have an expansion coil $w^3$ in its length. Any water that may be present with the steam in the superheating chamber $v$ can fall to the annular bottom of the superheating chamber where it will readily be evaporated by the heated wall $s$ of the combustion chamber with which it will be in contact. The outer tube or wall $t$ of the steam superheating chamber is provided at its upper part with a lateral screw nipple $t^2$ for connection to an engine or other device in which the superheated steam produced is to be utilized. The steam generator and steam superheater may, as shown, advantageously be arranged side by side and be carried by a plate $x$ common to them.

The liquid fuel burners for use in heating the steam generator and superheater are arranged within and carried by a stationary casing $y$ to which the plate $x$ carrying the said steam generator and superheater may be connected in a removable manner, as by joining it at one side at $y^1$ to the casing and detachably connecting it thereto, as by a pivoted screw $z$ and nut $z^1$ at the opposite side, so that the plate $x$ with attached parts can, when desired, readily be turned to one side for gaining access to the burners and to the combustion chambers $g$ and $s^1$. Each fuel burner may, as shown, comprise a length of piping 1 connected at one end to a tubular oil supply nipple 2 fixed to the lower portion of the casing $y$ which may, as shown, be of truncated conical shape. At its other end the tubing 1 is connected to a centrally arranged upwardly extending burner nozzle 3 carried by the said nipple 2. An intermediate portion of the piping 1 is formed into a conical shaped coil $1^a$ arranged above and co-axial with the burner nozzle 3. Arranged above and co-axial with the burner nozzle 3 is a tube 4, $4^a$, of double conical truncated shape, the upper portion 4 of which serves to support the coiled portion $1^a$ of the pipe 1. Each tube 4, $4^a$ is provided with an outer annual conical portion 5 supported within and by the casing $y$ and serving as a partition to separate the corresponding combustion chamber $g$ or $s^1$ from the lower part of the casing which is provided with one or more openings 6 for admitting air to the burner nozzle 3. Each burner tube 4, $4^a$ is also provided with an external segmental shaped partition 7 arranged to bear against a portion of the lower end of the combustion chamber wall $a$ or $s$. The casing $y$, at a part thereof above the annular conical partitions 5, is provided with an exhaust opening $h$. The arrangement is such that the hot products of combustion from the combustion chamber $g$ of the steam generator are caused to flow from one side of the bottom thereof into the lower end of the flue $f$ surrounding the steam generator $a$—$b$ and after flowing upward therethrough, to descend at the opposite side and thence pass to the exhaust outlet $h$, whilst the hot products of combustion will pass direct from the lower end of the combustion chamber $s^1$ of the steam superheater $s$, $t$ direct to the said exhaust outlet $h$. The oil supply nipples 2 at the lower ends of the casing may each be coupled to a pipe 8 that is common to them and is adapted to be coupled at one end $8^a$ to a liquid fuel supply pump $8^x$. The other end $8^b$ of the said pipe may be closed, or, as shown, in dotted lines, it may be adapted to be coupled to a liquid fuel reservoir $8^c$ containing air under pressure, so that should the pump cease to work for any reason, liquid fuel will automatically be supplied to the burner nozzles 3 by the air under pressure past a non-return ball valve 9 that is automatically held closed when the pump is working. The exhaust outlet $h$ may be connected to a chimney in the case where the apparatus is used with a stationary engine, or, as shown, to a horizontal induction pipe 10 when the apparatus is mounted on a vehicle, so that in each case the products of combustion will be caused to flow away by an inducing action. In the latter case there may be arranged at the junction of the exhaust outlet $h$ and induction tube 10, a pivoted plate or vane 11, to direct the products of combustion into the latter pipe in a direction to suit the direction of movement of the vehicle.

Apparatus constructed as described can be made of comparatively small size for producing superheated steam or fluid at very high pressure, say of the order of one or two thousand pounds to the square inch, and of very high temperature, and specially suitable for use in engines for motor propelled vehicles. Thus, for a thirty brake horse power engine, the steam generator with associated water supply chamber and intermediate flue, may, for example, be of a height of about twelve inches and a diameter of about seven inches, the steam superheater having a height of about seven or eight inches and a diameter of about four and a half inches. These dimensions are however only given by way of example.

The details of construction can be variously modified and the parts subject to heat be made of metal capable of resisting corrosion at high temperatures.

What I claim is:—

1. An apparatus for the production of steam at high temperature and pressure, comprising a steam generator and a steam superheater each comprising two cylindrical metal tubes having dome shaped upper ends arranged concentrically one within the other at a suitable distance apart and connected together at their lower ends in a fluid-tight manner so as to form an upper hollow parti-spherical chamber having a lower narrow annular shaped extension, means concentric with the steam generating chamber adapted to supply heated water under pressure to said chamber and means adapted to place the steam generating and superheating chambers in communication at their upper ends and the steam superheating chamber having an outlet at its upper end for the discharge of superheated steam under pressure.

2. An apparatus for the production of steam at high temperature and pressure comprising in combination, a steam generator having concentric water-receiving, steam-generating and fuel combustion chambers, a passage for water leading from said water-receiving chamber into said steam-generating chamber and a steam outlet from said steam-generating chamber; a steam super-heater combined with said steam-generator having a combustion chamber, an upper inlet for steam supplied from said generator, and an upper outlet for superheated steam; a conduit connecting the steam outlet of the steam generator to the steam inlet of the steam superheater; a water feed conduit connected to a water inlet of the steam-generator; means for forcing water under pressure through said conduit into the water-receiving chamber of said generator, and means causing the hot products of combustion from one of the combustion chambers to heat the water supplied through said conduit.

3. An apparatus for the production of steam at high temperature and pressure, comprising in combination, a steam generator having an upper inlet for water, an upper outlet for steam and a combustion chamber; an associated steam superheater having an upper inlet for steam, an upper outlet for superheated steam and a combustion chamber; a conduit connecting the steam outlet of the steam generator to the steam inlet of the steam superheater; a water conduit comprising two cylindrical tubes having dome shaped upper ends arranged concentrically with one another in spaced relation over said steam generator and forming therewith a flue in communication with one of said combustion chambers; an inlet in said water conduit for the admission of water under pressure thereinto and a tubular connection between said conduit and the top of the said steam generator.

4. An apparatus for the production of steam at high temperature and pressure, comprising in combination, a steam generator and associated steam superheater each comprising two metal tubes having dome shaped upper ends arranged concentrically one within the other at a suitable distance apart and connected together at their lower ends in a fluid-tight manner, forming an upper hollow parti-spherical chamber having a lower narrow annular shaped extension, the inner tube in each case providing a fuel combustion chamber; a water heater concentric with the steam generator and connected with the upper part of the latter; a steam conduit connecting the upper part of the steam generator to the upper part of the steam superheater; a steam outlet connection in the upper part of said superheater, liquid fuel burners arranged subjacent each of said combustion chambers and liquid fuel feed conduits extending into said combustion chambers and connected with said burners.

5. An apparatus for the production of steam at high temperature and pressure, embodying in combination a steam generator and associated steam superheater each comprising two metal tubes having dome shaped upper ends arranged concentrically one within the other at suitable distances apart and connected together at their lower ends in a fluid-tight manner to form upper hollow parti-spherical chambers having lower narrow annular shaped extensions, the inner tube in each case providing a combustion chamber; a water-heater comprising two cylindrical metal tubes having dome-shaped upper ends arranged concentrically with one another at a distance apart and connected together at their lower ends in a fluid-tight manner, said heater being arranged concentrically with and over the tubes comprising the steam generator to form therewith an annular flue in communication at one side with the combustion chamber of the steam generator and at another side with an outlet for hot products of combustion, the outer tube of said water-heater having an inlet for water under pressure; a pipe extending through and fixed to the upper ends of the concentric tubes of the water-heater and the outer tube of the steam generator and connecting the interiors of said water-heater and steam generator together at the upper parts thereof; a tubular connection between the upper ends of the steam generating and superheating chambers; a steam outlet connection in the upper part of the steam superheater and liquid fuel burners arranged below and adapted to heat the walls of the said combustion chambers.

6. An apparatus for the production of steam at high temperature and pressure, comprising in combination a combined water heater and steam generator formed respectively of pairs of concentrically arranged tubes having dome shaped upper ends closing the same, the tubes of each pair being connected together at their lower ends in a fluid-tight manner and arranged with the inner tube of the outer pair and the outer tube of the inner pair forming an annular space or flue therebetween, the inner tube of the inner pair of tubes providing a combustion chamber in open communication with the lower end of said space or flue at one side thereof; means closing the space between said flue and combustion chamber at opposite sides thereof; a pipe extending through and connected to the upper ends of the tubes comprising the water-heater and the upper end of the outer tube of the steam generator and establishing communication between the interiors of said water-heater and steam generator; a water spraying device connected to the end of the pipe opening into the steam generator; a steam superheater formed of two concentrically disposed tubes arranged adjacent to said water-heater, having dome-shaped upper ends closing the same, and their lower ends connected together in a fluid-tight manner with the inner of the last mentioned pair of tubes providing a combustion chamber; a tubular connection between the upper ends of said steam generator and superheater; a steam outlet connection in the steam superheater and means for heating the walls of the respective combustion chambers.

7. An apparatus for the production of steam at high temperature and pressure, comprising in combination, a steam generator; a steam superheater and a water-heater, each comprising a pair of tubes connected together at their lower ends and having dome shaped upper ends; the inner tubes of the steam generator and steam superheater respectively forming the walls of combustion chambers open at their lower ends, said water-heater being arranged concentrically with and over the steam generator to form therewith a flue in communication at one side with the adjacent lower portion of the combustion chamber of the steam generator and having an inlet for the admission of water under pressure; a tubular connection between the water heater and steam generator; a tubular connection between the upper ends of the steam generator and said steam supperheater; a steam outlet connection from the steam superheater; a support carrying the said steam generator, steam superheater, and water heater; a casing arranged below said support to which the latter is movably connected, and burners carried by said casing and arranged below said combustion chambers.

8. An apparatus for the production of steam at high temperature and pressure, comprising in combination, a steam generator, a steam superheater and a water-heater; each comprising a pair of tubes connected together at their lower ends and having dome-shaped upper ends, the inner tubes of the steam generator and steam superheater respectively forming the walls of combustion chambers open at their lower ends; said water-heater being arranged concentrically with and over the steam generator to form therewith a flue in communication at one side with the adjacent lower portion of the combustion chamber of the steam generator and having an inlet for water under pressure; a tubular connection between the water heater and steam generator; a tubular connection between the upper ends of the steam generator and steam superheater, a steam outlet connection for the steam superheater; a support carrying the said steam generator, steam superheater and water-heater, a casing arranged below the said support to which the latter is movably connected; oil burners carried by said casing and arranged below said combustion chambers, said casing having inlets for the admission of air to said burners and an exhaust opening in communication with the outlet end of said flue and with the combustion chamber of said superheater for expelling burnt gases therefrom and means within the casing separating said air inlets from said exhaust opening.

9. An apparatus for the production of steam at high temperature and pressure, comprising in combination, a tubular water-heater, steam generator and steam superheater connected together at their upper ends in series, with a water inlet at one end and a superheated steam outlet at the other end, said steam generator and steam superheater each having tubular combustion chambers open at their lower ends and said water heater and steam generator being arranged to provide a flue therebetween in communication at a side with one side of the combustion chamber of the steam generator; a support carrying said parts; a casing to which said support is movably connected; said casing having inlets for the admission of air to said combustion chambers and an outlet for products of combustion from said flue and the combustion chamber of the steam superheater; liquid fuel nozzles and burners carried by said casing and arranged below said combustion chambers; a liquid fuel supply pipe arranged between each nozzle and its corresponding burner and extending upward into the associated combustion chamber, part of the length of each pipe being coiled within its corresponding burner, and partitioning means arranged to separate the air inlet openings in said casing from the exhaust outlet therein and to partly support the coiled portions of said pipes.

10. An apparatus for the production of steam at high temperature and pressure, comprising a steam generator having a highly heated body against which heated water is projected to form steam; a steam superheater having a highly heated body upon which steam is projected to superheat the same; means for placing the upper ends of said generator and superheater in communication with one another; means for heating the steam generator; means for heating the steam superheater; a water chamber concentric with the steam generator and connected therewith; means for forcing water under high pressure through said water chamber and into said steam generator and means for heating the walls of said water chamber whereby water flowing therethrough may be heated to a temperature corresponding substantially to the pressure of the steam to be produced, the surface of the highly heated body against which water at high temperature and pressure is projected being provided with means adapted to break up globules of water coming into contact therewith.

Signed at London, England, this thirtieth day of September, 1925.

SYDNEY HOWARD SHEPHERD.